United States Patent [19]

Bittel et al.

[11] 3,992,580
[45] Nov. 16, 1976

[54] DISCRETE CONTROL CORRECTION FOR SYNCHRONIZING DIGITAL NETWORKS

[75] Inventors: Raymond H. Bittel, Reston, Va.; Harry A. Helm, Bethesda, Md.; Maurice J. Raffensperger, Reston, Va.

[73] Assignee: The United States of America as represented by the Secretary of the Army, Washington, D.C.

[22] Filed: Apr. 24, 1975

[21] Appl. No.: 571,175

[52] U.S. Cl. .......................... 178/69.5 R; 325/58; 179/15 BS
[51] Int. Cl.² .......................................... H04L 7/00
[58] Field of Search ............ 325/4, 58; 178/69.5 R; 179/15 AF, 15 BS, 15 A; 328/63, 72, 151, 179; 307/238, 269; 340/146.1

[56] References Cited
UNITED STATES PATENTS

| 3,453,594 | 7/1969 | Jarvas | 179/15 BS |
| 3,467,779 | 9/1969 | Duerdoth | 179/15 BS |
| 3,652,800 | 3/1972 | Dooley | 179/15 AF |
| 3,873,773 | 3/1975 | Guy, Jr. | 178/69.5 R |

Primary Examiner—Robert L. Griffin
Assistant Examiner—Jin F. Ng
Attorney, Agent, or Firm—William G. Gapcynski; Frank R. Agovino; Lawrence A. Neureither

[57] ABSTRACT

In a digital communications system having widely dispersed nodes transmitting between each other, a method and apparatus for synchronizing the processing of data at a node. Data transmitted between nodes is stored in speed buffers. The output of each buffer at a node is connected to the nodal processor and is controlled by the nodal clock. Synchronization is accomplished by performing a periodic adjustment of the frequency of the nodal clock. This adjustment is arrived at by sampling the buffer content of each node and extracting an error signal which represents the buffer position relative to the half full buffer position. The error signal is suitably weighted by a control and summed with all other weighted buffer error signals to produce a total error signal, which is added linearly to the original initial condition of the nodal clock and converted to an equivalent frequency.

11 Claims, 7 Drawing Figures and demodulation, and nodal processor operation. Together with the VCXO interim storage devices are provided to accomplish link synchronization, into which the received demodulated pulse stream is read under the control of a recovered pulse stream timing signal. The VCXO provides the timing signal to read the pulses out of the storage device. Periodically at a node, all storage devices are sampled and error signals are derived, summed and weighted in a prescribed manner. This total error signal is then used to increase or decrease the frequency of the VCXO of the node. This sampling is performed periodically where the period for applied corrections may range over minutes to many hours and is a function of the number of nodes in the network, the storage device size, the VCXO specifications such as gain, setability, accuracy and drift, and transmission media anomalies. As a consequence of these periodic corrections, the VCXO will respond by increasing or decreasing its timing signal to provide the storage readout signal for the pulse stream to be input to the nodal processor.

This procedure for synchronizing a node in a digital communications system is further refined by using a control strategy that reacts to a rapid increase or decrease in the fill in an individual storage element. The control mechanism detects the rapid change in the state of the storage element indicative of a transmission path failure, or nodal failure and drops that line in the weighting process to derive a correction signal to the BCXO. The interim storage is sized to respond to transmission path variations, for example, those characterizing the troposcatter medium. As a result, this synchronization equipment is sensitive to failures of that part of the network from which it receives communication, a desired effect, but this sensitivity is used constructively to enhance nodal synchronization and so that system malfunctions are not propagated to other parts of the network.

BRIEF DESCRIPTION OF THE DRAWINGS

The following detailed description will enable the invention to be more fully comprehended. A list of relevant figures accompanies the description in which.

DESCRIPTION OF THE PREFERRED EMBODIMENT

Figure 1:
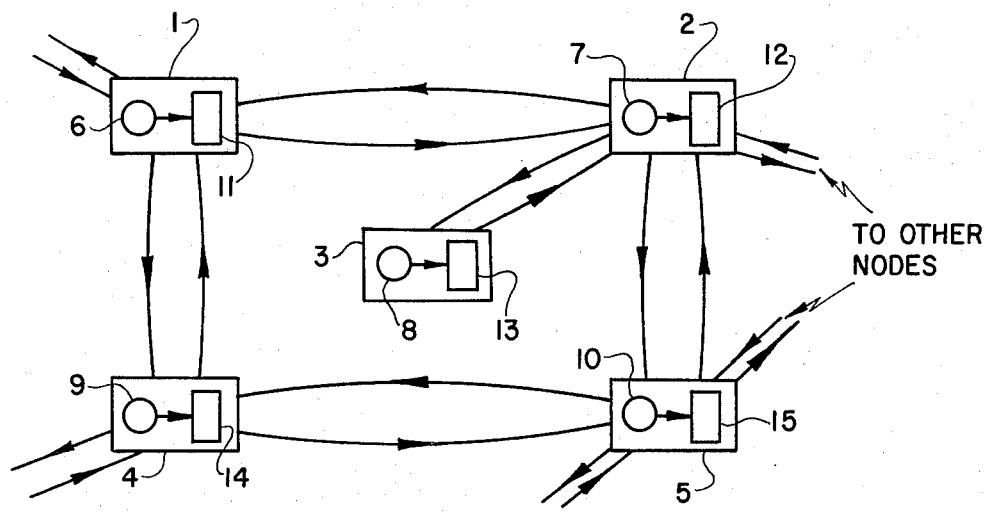
FIG. 1 is a block diagram of a portion of a digital network in accordance with the invention.

A portion of a digital communication network in accordance with the present invention is shown in block diagram form in FIG. 1. Nodes of this network that could represent switching center 1, 2, . . ., 5 are interconnected by means of transmission paths of possibly various media types. These nodes are interpreted as being geographically separated. Pulse streams carried via the transmission media are input to each node. These streams may be of different rates and are considered to be asynchronous with respect to one another. In order that the node be able to process the streams simultaneously they are input to a synchronizing unit 6, 7, . . ., 10. These units place the streams into synchrony with respect to one another and then the streams are input to the nodal processors 11, 12, . . ., 15, where they are transmitted to some terminating device as to another node.

Figure 2:
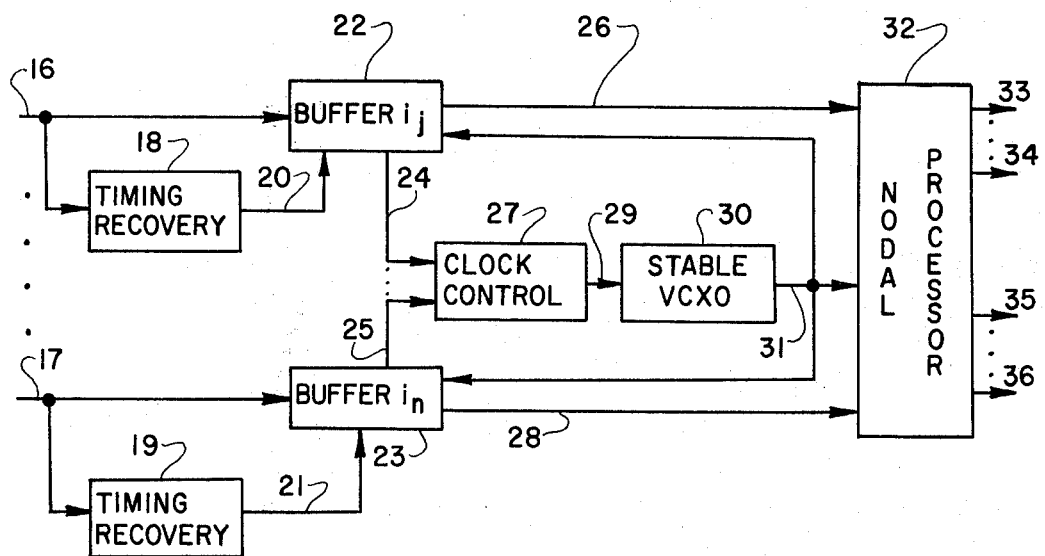
FIG. 2 is a block diagram showing a nodal synchronizing apparatus used in a system with a multiplicity of incoming pulse streams.

FIG. 2 shows a functional block diagram of the synchronization method in accordance with the present invention. Node i receives data streams. These streams 16, 17 are demodulated and are input to timing recovery circuits 18, 19 and interim storage devices termed buffers 22, 23. The timing recovery circuits extract timing information from the received data streams in order to provide timing signals 20, 21 that the data streams may be read into the buffers. A buffer is provided for each incoming transmission line. Periodically, the buffers are sampled to provide signals 24, 25 that are input to the clock control mechanism 27. These signals are weighted and algebraically combined to provide a single signal 29 in the form of an equivalent voltage that is input to a stable voltage controlled crystal oscillator (VCXO) 30. The oscillator accepts this signal and uses it to change its frequency, either increasing or decreasing it as appropriate. This new frequency 31 is then used as a buffer read timing signal to read the pulse streams 26, 28 from the buffer. This new frequency is also input to the nodal processor 32 to be used for timing purposes within this unit. The output of the processor is transmitted to either terminating devices 33, 34 or to other nodes 34, 36.

Figure 3:
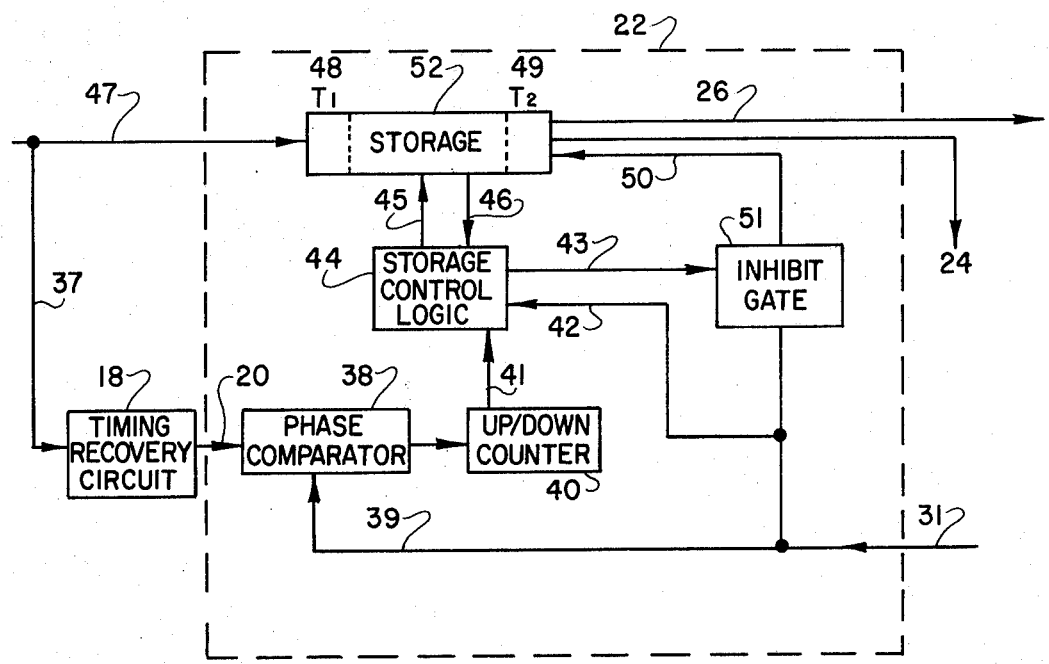
FIG. 3 is a diagram of the timing recovery, interim storage and control subsystem of the invention.

FIG. 3 shows a block diagram of the timing recovery, interim store element and control logic subsystem of the synchronization system in accordance with the present invention. The timing recovery circuit 18 is of the conventional type and can be a phase or frequency locking device. This recovery device accepts the incoming signal 37 and produces a timing signal 20 that is input to a phase comparator 38, which extracts the phase of the timing signal and compares it with that of the node clock timing signal 39. The phase difference gates an up/down counter 40. The counter outputs a signal 41 to the storage control logic 44. This logic then moves a buffer pointer up or down in accordance with the counter signal. This buffer control uses the node clock timing signal 42 for its operation. The interim storage element 52 is a first in — first out shift register where each cell of the register stores one element of the pulse stream. As new elements of this pulse stream enter the register, the elements occupying the register are advanced one position at a time. Thus each new element entering the register advances all the existing elements in the register one position. The storage control logic output 45 functions as the pointer to the leading element in the register. Each element in the register is read out under control of the local node clock signal 50. The initial setting of the buffer is at the half full position. If the phase of comparison of the recovered timing signal 20 and the local clock timing signal 39 is positive $\pi$ radians, the pointer is retarded one cell. The position of the pointer in the register indicates the cell at which the elements are read out. If the pointer is stationary, the node will be in synchrony with the remaining network nodes. The storage 52 contains preset thresholds $T_1$, $T_2$ at the low side 48 and at the high side 49. If the pointer moves below the $T_1$

DISCRETE CONTROL CORRECTION FOR SYNCHRONIZING DIGITAL NETWORKS

The invention described herein may be manufactured and used by or for the Government for governmental purposes without payment of any royalty thereon.

BACKGROUND OF THE INVENTION

1. Field of the Invention

This invention relates to a timing and synchronization by which a digital communication system, composed of many nodes interconnected by transmission paths characterized by various media, can be brought into synchronism. The signals on these transmission paths are asynchronous with respect to one another. The invention further relates to clock synchronization at system nodes especially but not exclusively to nodal subsystems that require a timing signal for operation, for example, time division multiplexers, modulation devices, security devices, or the nodal processors in communication switches.

2. Description of the Prior Art

For a multi-node digital communication, the maintainance of clock synchronism at all nodes is a formidable problem. The use of highly stable clocks, one at each system node, has been proposed as a solution to the problem, but this proposal appears to have certain deficiencies. The timing device would be expensive and the clock system would require periodic adjustment necessitating interruption of received transmission at a node caused by differences in the received transmission rates varying as a function of such physical transmission line characteristics as temperature, humidity and atmospheric disturbances.

Another proposed solution is a common timing signal transmitted from a single designated node to all other system nodes. This proposed solution appears to have certain deficiencies in that it would require an expensive timing signal transmission system to insure that the timing signal to all other nodes was not lost anywhere in the system. Furthermore, transmission path delay variations, as previously mentioned, would cause the nodes receiving the timing signals to respond to these variations and hence these clocks would exhibit timing transients which would result in abnormal nodal operation. Since timing of high bit rate digital streams is critical, a transient timing signal would make such time almost impossible.

A technique to achieve nodal synchrony is disclosed by J. S. Mayo in U.S. Pat. No. 3,136,861 issued on June 9, 1964. In accordance with that invention, each pulse signal to be multiplexed has its pulse repetition rate raised to a common repetition frequency by the insertion of control signals into the pulse signal. After multiplexing, transmission, demultiplexing and receiving the transmitted signals, predictive techniques are employed to remove the inserted control signals even in the presence of large transmission error rates. The predictive techniques determine when a control signal should have occurred in the transmitted signal, and when a control signal is lost due to transmission error. This determination is used to minimize the loss of information due to framing error. In addition, because of the composition of waveforms of higher frequency and the predictive techniques employed, there is no necessity for transmitting additional information regarding the composition of the signals of higher frequency. Because the control information is inserted into the original pulse signal at the originating node and transmitted to the receiving node, it must be received error free. If not, the necessary removal of the control information pulse may not occur, and though the control information is received correctly, it is used to delete pules from the data stream thereby creating gaps in the stream which must be smoothed to restore the pulse stream to its original form. This action must be accomplished before the pulse stream can be processed at the receiver node. For example, if the pulse stream were originated at a node and destined for a distant node and the path traversed several interim nodes, this addition and deletion of control information would be accomplished between every node path in the pulse stream path.

A disclosure in U.S. Pat. No. 3,042,751 issued to R. S. Graham on July 3, 1962 discloses a technique for achieving system synchrony that preceeded Mayo's disclosure. Although similar in structure, Graham's techniques used a variable delay insertion technique for control. However, unlike Mayo's disclosure, the delay was encoded and transmitted on a separate channel than that of the transmitted pulse signal being controlled. This technique reduces available channel capacity with respect to other pulse stream transmission. For this technique, the control information is subject to the same problems of error free transmission as with Mayo's, but in addition, the control channel must not fail. Otherwise, control information of the pulse stream would be completely lost.

Another technique to achieve network synchronization was disclosed by W. T. Deurdoth in U.S. Pat. No. 3,467,779 issued on Sept. 16, 1969. In this disclosure, a continuous correction derived from a pulse stream interim storage element under control of a master timing oscillator was used to increase or decrease the frequency of the master timing oscillator depending on the state of the storage element. Because of the continuous nature of the frequency correction applied to the master oscillator, any disruption of the pulse stream would cause immediate changes in the state of the storage element which would immediately cause the master oscillator to change frequency. But this would cause disruptive changes in the timing of other streams under the control of the master oscillator. This affect would propagate to other nodes through pulse streams timed by the master oscillator and a timing transient would result.

SUMMARY OF THE INVENTION

It is the object of the present invention to obviate the need for control pulses inserted into the pulse streams or control pulses transmitted on a separate channel to a node receiving the pulse streams to accomplish synchronization.

It is a related object of the present invention to eliminate the need to continuously correct a master oscillator that provides timing for nodal functions.

It is a further related object of this invention to diminish the suceptibility of the equipment providing nodal synchronization to transmission line anomalies, to line dropouts, or to the malfunction of nodes from which it receives pulse streams.

According to the present invention, the switching system of a digital communication network has a stable voltage controlled crystal oscillator (VCXO) to provide timing for functions such as TDM and modulation threshold, a signal 46 is sent to the storage control logic 44 and outputed 43 to an inhibit gate 51. This gate passes timing 31 from the local node clock for storage read out signal 50. If it receives an inhibit signal 43 from the storage control logic 44 the gate 51 is enabled and read out from the storage ceases since timing 31 is not passed. The same action occurs at threshold $T_2$ at the upper end of the register. To prevent a premature readout inhibit if the signal 47 is still present, the buffer is sized to account for nodal clock anomalies such as path delay variation that cause pointer excursion. Hence, these thresholds will be reached if the input signal 47 is lost or inhibited in any manner. Under normal operation the pointer will move up or down depending upon the up/down counter indicator. Under normal operation, however, it is a characteristic of a stable VCXO to drift in frequency in a slow manner. The buffer, however, is sized to account for this drift anomaly so that it would not require resetting for extended time periods as are desired.

Figure 4:
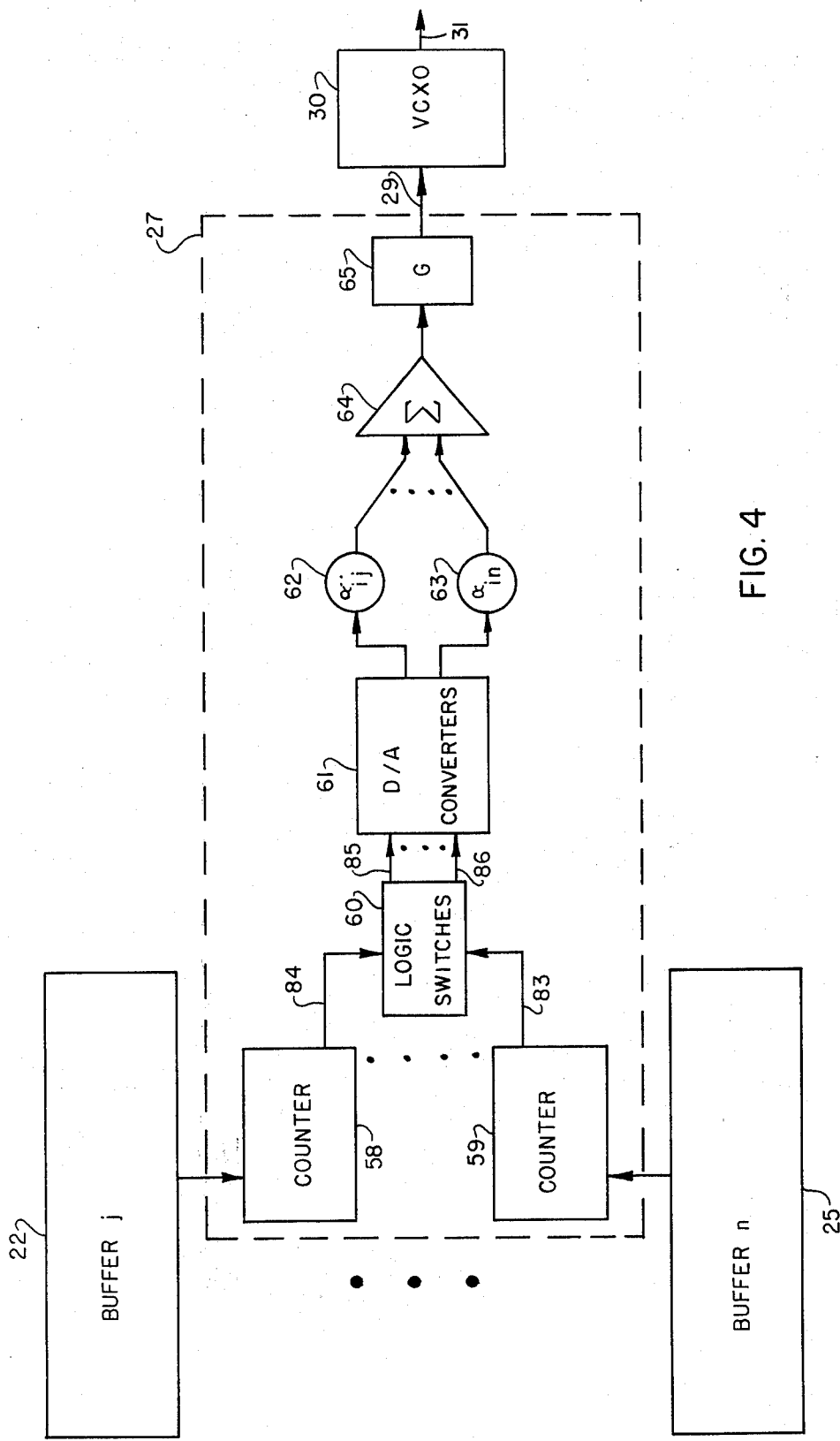
FIG. 4 is a diagram of the clock control.

FIG. 4 shows the clock control unit that is part of this invention. The counters 58, 59 monitor the pointer position with respect to the half full or zero buffer position. At a specific interval of T seconds these counters are sampled by logic switch 60 and the resulting digital signals are input 85, 86 to a digital to analog converter 61. The resulting analog signals are then individually weighted 62, 63 according to pre-determined weighting factors $\alpha$ and combined by summer 60 to form one analog signal.

The combined signal is amplified 65 and then output 29 to a voltage controlled crystal oscillator 30. The resulting signal from the oscillator is used for necessary timing purposes as buffer readout, node processing and all logic timing.

Figure 7:
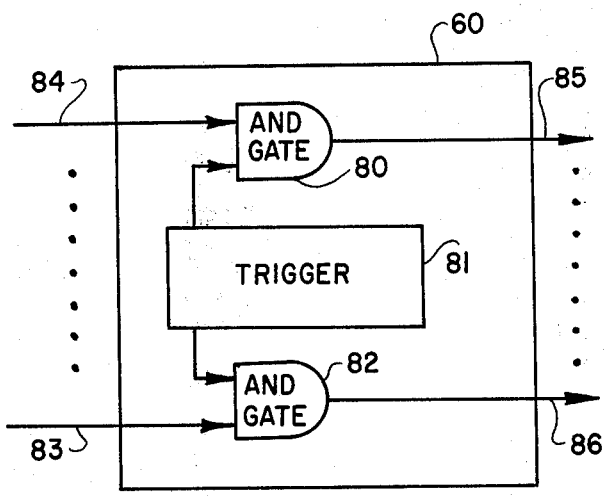
FIG. 7 is block diagram of a conventional logic switch used to periodically sample a circuit.

Referring to FIG. 7, a conventional sampling circuit is illustrated. Counter outputs 83, 84 are connected to one of the inputs of standard AND gates 80, 82. To the other input of the AND gates 80, 82 are connected to trigger circuit 81 consisting of an integrated circuit with external resistor and capacitor components preset to pulse every T seconds.

Mathematically, the synchronization method is modeled at the ith node by the difference equation:

$$f_i[(n+1)T] = GT \sum_{j \neq i}^{n} \alpha_{ij} \sum_{k=0}^{n} [f_j(kT) - f_i(kT)] + f_i(O) \quad (1)$$

where n denotes the nth sample, $n = 0, 1, 2, \ldots$, and $f_i(O)$ is the initial frequency of operation at the time the ith node is set into operation. Considering all system nodes, then the equation in matrix form becomes:

$$\underline{F}[(n+1)T] = \underline{A} \sum_{K=0}^{n} \underline{F}(kT) + \underline{F}(O) \quad (2)$$

where G is the accuracy gain factor of the nodal clock 30, where F(O) is the vector of initial condition and A is the matrix of weighting multiplied by the common gain-time product, and is given by:

$$\underline{A} = GT \begin{bmatrix} -\sum_{j \neq 1}^{n} \alpha_{ij} & \alpha_{12} & \alpha_{13} & \cdots & \alpha_{1n} \\ \alpha_{21} & -\sum_{j \neq 2}^{n} \alpha_{ij} & \alpha_{23} & \cdots & \alpha_{2n} \\ & & & & \\ \alpha_{n1} & \alpha_{n2} & \alpha_{n3} & \cdots & -\sum_{j=1}^{n-1} \alpha_{ij} \end{bmatrix} \quad (3)$$

Propagating equation (2) forward and collecting terms $$F(nT) = [\underline{A} + \underline{I}]F(O) = [\underline{A} + \underline{I}]^n F(O) \quad (4)$$

where I is the identity matrix of order $n$. Because the row sums of matrix $[\underline{A} + \underline{I}]$ are unity, it is a singly stochastic matrix. For a stable system, all eigenvalues of $\underline{A}$ must be less than or equal to unity. Then it is a function of the stochastic matrix that in the steady state $\lim_{n \to \infty} [\underline{A} + \underline{I}]^n$ exists and if $\underline{H} = [1, 1, 1, \ldots, 1]^T$, where $\tau$ denotes the transpose of a matrix, then in steady state $$\lim_{n \to \infty} [\underline{A} + \underline{I}]F(O) = \beta \underline{H} \quad (5)$$

where $\beta$ is a scalar and is the weighted average of the initial condition frequencies of the network nodes. Equation (5) implies that one of the eigenvalues is unity and the remaining eigenvalues are less than unity. Since $\alpha_{ij}$, $i$ and $j = 1, 2, \ldots, n$, and the GT product is free to be chosen to achieve network stability, the range of their values to assure stability is investigated.

Let $x_i(k)$ be the buffer level in each jth buffer at node $i$, and let $x_i(k)$ be the composite buffer equal to $\Sigma x_{ij}(k)$ at the kth sample, then $$\underline{x}(k+1) = \underline{x}(k) + T\underline{C}F(k) \quad (6)$$

where C is the network connectivity matrix of ones and zeros.

Let $GT\alpha_{ij} = \sigma_i$ for $i \neq j$, $j=1, 2, \ldots, n$. Then equation (1) is written as $$f_i(k+1) = f_i(1) + \sigma_i [x_i(k=1) - x_i(k)] \quad (7)$$

where $i = 1, 2, \ldots, n$.

This set of equations forms the matrix equation $$\underline{F}(k+1) = \underline{F}(k) + \text{diag}(\sigma_1, \ldots, \sigma_n)[\underline{x}(k+1) - \underline{x}(k)] = I + \text{diag}(\sigma_1, \ldots, \sigma_n)\underline{C}[\underline{x}(k+1) - \underline{x}(k)]$$

or $$\underline{F}(k) = (\underline{I} + \underline{AC})^k \underline{F}(O) \quad k \geq O \quad (8)$$

where $\underline{A} = \text{diag}(\sigma_1, \ldots, \sigma_n)$.

Let $\lambda_1, \ldots, \lambda_n$ be the eigenvalues of $\underline{AC}$, with $\underline{A}$ and $\underline{C}$ symmetric. $\lambda_1, \ldots, \lambda_n$ are real. Let $\underline{E} = n\sigma_l \underline{I} + \underline{AC}$ and consider $\sigma_l = \max(\sigma_i: i = 1, \ldots, n)$. Then $\underline{AC} = -n\sigma_l \underline{I} + \underline{E}$. If $\theta_1, \ldots, \theta_n$ are eigenvalues of $\underline{E}$, then $\lambda_i = -n\sigma_l + \sigma_i$. This implies all of $\theta_i$ are real. From the definition of $\underline{C}$ with all $\lambda_i$ positive, then $e_{ij} = \lambda_i C_{ij} \geq O$, $i \neq j$, and $$C_{ij} = -\sum_{j \neq i}^{n}$$

$C_{ij} \geq -(n-1)$. This implies $e_{ii} = n\sigma_i + \sigma_i C_{ii} \geq \sigma_i > O$, if all $\sigma_i$ assumed $> O$. Therefore, $\underline{E}$ is a non-negative square matrix in which row sums are $n\sigma_l$, and $|\theta_i| \leq n\sigma_l$, $i = 1, 2, \ldots, n$. Because $\underline{C}$ represents a connected network, it is irreducible and having assumed $\sigma_i > O$, $i = 1, 2, \ldots, n$, then $\underline{AC}$ and $\underline{E}$ are irreducible. This implies there exists only one $\theta_i$, say $\theta_l$, such that $\theta_l = n\sigma_l$.

Since $\sigma_i \neq O$, $i = 1, 2, \ldots, n$, then $\sqrt{\underline{A}} = \text{diag}(\sqrt{\sigma_1}, \sqrt{\sigma_2}, \ldots, \sqrt{\sigma_n})$ is non-singular and $(\sqrt{\underline{A}})^{-1} = \sqrt{\underline{A}^{-1}} = \text{diag}(\sqrt{\sigma_1}^{-1}, \ldots, \sqrt{\sigma_n}^{-1})$, Let $\underline{D} =$ $(\sqrt{\underline{A}})^{-1}\underline{E} \sqrt{\underline{A}} = n\sigma_i \underline{I} + (\sqrt{\underline{A}})\underline{C} \sqrt{\underline{A}}$. Now $\underline{D}$ is symmetric and has the same eigenvalues as those of $\underline{E}$. Let there exist a vector $\underline{y}$ and consider $\underline{y}^T \underline{D}\underline{y}$.

$$\underline{y}^T \underline{D}\underline{y} = n\sigma_i(\underline{y}^T \underline{y}) + n\underline{y}^T (\sqrt{\underline{A}})\underline{C}(\sqrt{\underline{A}})\underline{y} \quad (9)$$

Let $\underline{c} = -\underline{I} + \underline{P}$ where $\underline{P}$ is positive semi-definite. Then equation (9) is written:

$$\underline{y}^T \underline{D}\underline{Y} = n \sum_{i=1}^{n} (\sigma_1 - \sigma_i) \underline{y}_i^2 + n[\sqrt{\underline{A}}(y)]^T \underline{D}[\sqrt{\underline{A}}(\underline{y})] \geq O \quad (10)$$

since $\sigma_1 = \max(\sigma_i)$ and P is positive semi-definite. Therefore, D is positive semi-definite with non-negative eigenvalues, and $\theta_i \geq O$, $i = 1, ..., n$. Hence, $\theta_i = n\sigma_1$ and $O \leq \theta_i < n\sigma_i$ $i = 2, ..., n$. Now $\lambda_1 = O$ and $-n\sigma_i < \lambda_i < O$, $i = 2, ..., n$. Suppose $\beta_i$ are eigenvalues of $[\underline{I} + \underline{AC}]$. Then, $\beta_i = 1 + \lambda_i$, $i = 0, 1, 2, ..., n$ or $\beta_1 = 1$, $1 - n\sigma_1 \leq \beta_i < 1$, $i = 2, ..., n$.

If $O < \sigma_i < n/2$, $= 1,2, ..., n$, then $-1 < 1 - n\sigma_i = 1 - n \cdot \max(\sigma_i) < 1$ and therefore, $\beta_1 = 1$ and $\beta_i < 1$, $i = 2, ..., n$. Now $\sigma_i = GT\alpha_i$ for the system. Hence, $$O < GT\alpha_i < 2/n \quad (11)$$

establishes the stability bounds. That $\beta_1 = 1$ and $\beta_i < 1$ $i = 2, 3, ..., n$ indicates that the system has one and only one unit eigenvalue. Consequently, the network node frequencies will converge to a weighted average of the base frequencies as described by equation (5).

Figure 5:
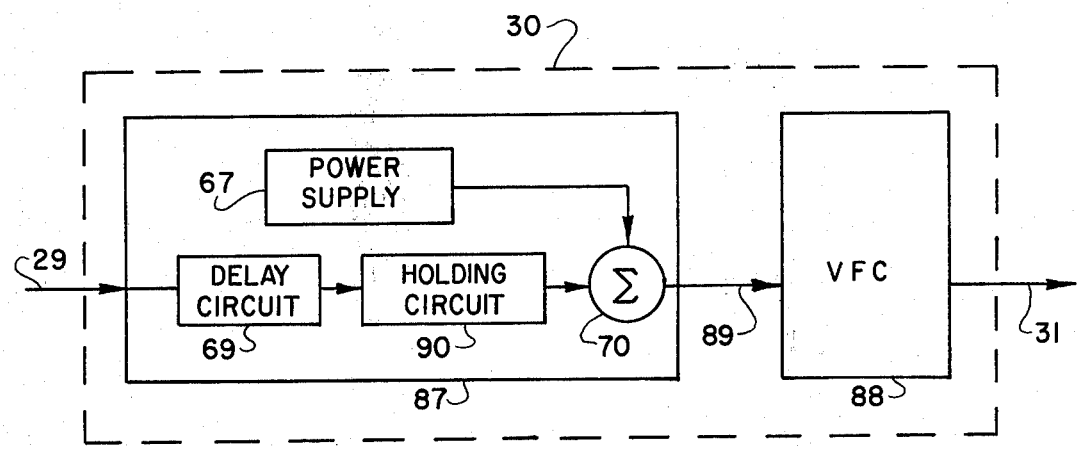
FIG. 5 is a diagram of the voltage controlled crystal oscillator.

In order to perform the above analysis, a model of the VCXO 30 was assumed. This model is identified in FIG. 5. The input 29, which is in the form of a voltage, is connected to the input of the VCXO control 87. The voltage to frequency converter (VFC) 88 is a nonlinear device which converts the error input voltage 29 to an equivalent frequency 31. In effect, the input voltage 29 is used to adjust the operating frequency 31 of the VCXO. The error signal 29 from the clock control 27 is received by a delay circuit 69 which functions to pass the signal gradually over a given period of time which is much less than the correction period T. The delay circuit 69 output is connected to the input of a holding circuit 90 which is a power supply having a continuous voltage output equal to the last received voltage input. Power supply 67 provides a continuous voltage signal which corresponds to the initial operating frequency. The outputs of the power supply 67 and the holding circuit 90 are added linearly to form an output voltage signal 89 which corresponds to the operating frequency 31. This signal 89 is fed into a voltage to frequency converter 88 which converts the signal to the equivalent operating frequency 31.

The VCXO in the invention does not function in the usual manner of a voltage controlled crystal oscillator. In the usual manner, the oscillator operating frequency, at the time of each correction, is used as a basis around which the correction is made. In this invention, the basic frequency around which the periodic correction is made is that stored in the power supply 87 as an equivalent voltage at the time the node is brought into operation and not the operating frequency of the oscillator at the correction time.

Figure 6:
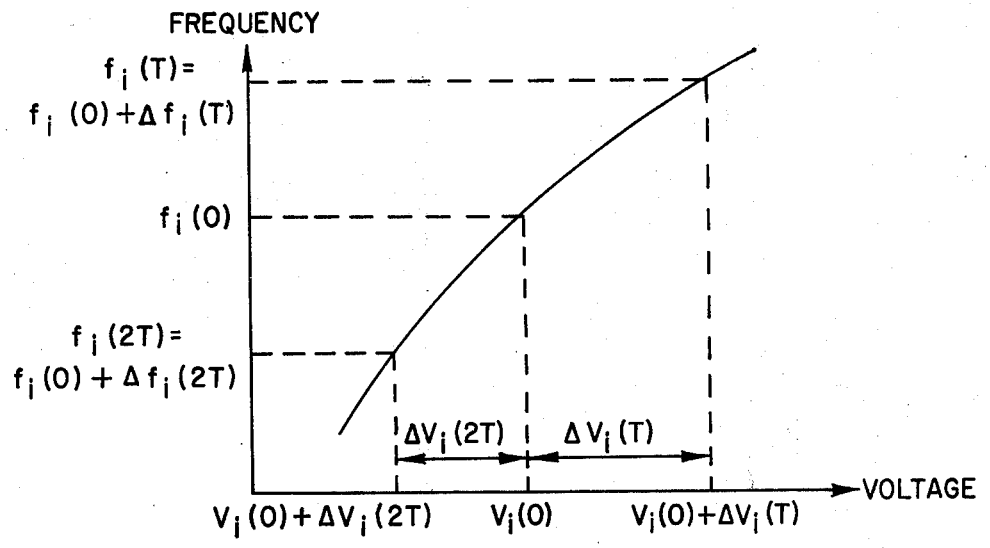
FIG. 6 is a graph of the VCXO operational function.

The VCXO function operation is shown in FIG. 6. The initial operating frequency, $f_i(O)$ is maintained by the power supply 67 as an equivalent constant voltage. At time T seconds, the first correction is made. The voltage increment is $\Delta V_i(T)$ and is assumed positive. The conversion for $\Delta V_i(T)$ is $\Delta f_i(T)$ which is added to $f_i(O)$ to produce a new operating frequency $f_i(T)$. As discussed, the addition does not produce $f_i(T)$ immediately. Rather, the addition is carried out over a given time interval much less than the correction period T. The operating frequency $f_i(T)$ is not changed until the next correction time approximately T seconds later. At that time, $t = 2T$, a new correction $\Delta V_i(2T)$, assumed negative, is made. The correction is not made to the operating frequency $f_i(O) + \Delta f_i(T)$ but rather to $f_i(O)$, the basic frequency. The new frequency, $f_i(2T) = f_i(O) + \Delta f_i(2T)$, is now used over the time period until the next correction at $t = 3T$ seconds. If the oscillator were operating in the usual manner, the new operating frequency at $t = 2T$ would be $f_i(2T) = f_i(O) + \Delta f_i(T) + \Delta f_i(2T)$. However, this usual operation is not evidenced in this invention.

In the ideal situation, when the steady state is reached, say at node $i$ and time $t = ST$, $\Delta V_i(ST) = O$ and $f_i(ST) = f_i((S-31\ 1)T)$. Since $f_i(ST) = f_i(O) + \Delta f_i(ST)$ and $f_i((S-1)T) = f_i(O) + \Delta f_i((S-1)T)$ then $$\Delta f_i(ST) = \Delta f_i((S-1)T) \quad (12)$$

Equation 12 is accomplished by the apparatus through the function of the holding circuit 90. Since the holding circuit is a power supply with a continuous output equal to the input of the last voltage signal received by it, when the error input voltage 29 is zero at the steady state time $t = ST$, the holding circuit 90 continues to output the last signal received at time $t = (S-1)T$ which results in $\Delta f_i(ST) = \Delta f_i((S-1)T)$. Therefore, $f_i(ST) = f_i((S-1)T)$ and the steady state operating frequency is maintained.

Because the synchronization scheme allows for the selection of the weighting factors $\alpha_{ij}, j \neq i, i=1, 2, ..., n$, then by adjusting those factors, the synchronization can be configured as a master-slave system, an independent node system or a hierachical system. For a master-slave system, one node is designated the master, say node k, and if there are m input lines then $\alpha_{kj} O$, $k \neq j, j=1, 2, ..., m$. That is, the master node is not corrected but rather distributes its time to all other nodes which operate in the manner described in this invention. The result of the repeated corrections is that all other node frequencies in the system will approach the master node frequency and in steady state will equal this frequency.

In an independent node system all $\alpha_{ij} = O$ at each node indicating that no corrections are made to any clocks. Here the oscillators are independent and free running. For a hierachical system, some of the $\alpha_{ij}$'s at each node may be weighted more heavily than others. This indicates that certain nodes in the network are to be given more weight than others and have more influence on the weighted average steady state network operating frequency. Hence, a nodal hierachical structure may be super imposed on the network. In all cases, the stability constraint, $O < GT\alpha_{ij} < 2/n$, must be satisfied for all weighting factors $\alpha_{ij}$ at all nodes in the system.

The mathematical development given here is predicated on the fact that all nodes must correct simultaneously and carry T seconds. For this invention, the more general case, nodes correcting approximately every T seconds and not all correcting simultaneously still has the stability boundary as derived, and the network will converge to a weighted average of the base frequencies. However, the convergence will take a greater time and more correction than that of simultaneous correction.

We claim:
1. In an n-node digital network, an apparatus for synchronizing the processing of data arriving at a node from other nodes comprising:
 a. means for storing received data bits arriving from each interconnected node having an output connected to the input of a nodal processor;
 b. means for timing and controlling the release of data from the output of each of said storage means connected to said storage means; and
 c. means for adjusting periodically the frequency of release of data by said timing and control means connected to said timing and control means, and having means for sampling, weighting and summing the level of fill of each said storage means whereby the level of fill of each said storage means is sampled, weighted and summed by said adjusting means and the frequency of release of data by said timing and control means is selectively changed to minimize underfilling and overfilling of each of said storage means.

2. The apparatus as described in claim 1 wherein said storing means comprises a plurality of speed buffers with timing recovery circuits.

3. The apparatus as described in claim 1 wherein said timing and control means comprises a voltage controlled crystal oscillator with an accuracy gain factor G.

4. The apparatus as described in claim 1 wherein said adjusting means comprises a clock control circuit which every T seconds extracts a voltage corresponding to the level of fill of said storage means as compared to the half full level, sums said voltages according to a weighting factor $\alpha$ of each of said storage means, and selectively changes the frequency of release of said timing and control means to minimize underfilling and overfilling of each of said storage means.

5. The apparatus as described in claim 4 wherein said periodic adjustment T is less than $2/(G)(n)(\alpha_l)$, wherein $\alpha_l$ is the largest weighting factor $\alpha$ of the network, G is said accuracy gain factor and n is the number of nodes in the network.

6. A method for synchronizing the incoming data of a node of an n-node interconnected digital network comprising:
 a. storing the incoming data arriving from each node in a storage bank;
 b. sampling simultaneously the stored data from each node on a first in, first out basis, said simultaneous sampling controlled by a clock having an accuracy gain factor G;
 c. processing the sampling obtained from the storage banks by weighting each signal according to a preselected weighting factor $\alpha$ and summing all said weighted signals; and
 d. adjusting periodically every T seconds by clock control means the rate of sampling of the stored data according to the signal resulting from said processing to minimize underfilling and overfilling of the storage banks.

7. The method as recited in claim 6 wherein said adjusting comprises selectively increasing and decreasing the frequency of said rate of sampling according to the state of fill of each said storage bank and the weighting factor $\alpha$ associated with said storage banks.

8. The method as recited in claim 6 wherein said periodic adjustment T is performed at least every $2/(G)(n)(\alpha_l)$ seconds, where $\alpha_l$ is the largest weighting factor $\alpha$ of the network, G is said accuracy gain factor and n is the number of nodes in the network.

9. A control circuit for periodically adjusting a clock used for dictating frequency of release of data simultaneously from storage banks to minimize underfilling and overfilling of the storage banks comprising:
 a. a plurality of counter means connected to the storage banks to monitor the level of fill of each bank with respect to the half full level producing signals corresponding thereto having an output;
 b. a plurality of logic switches for periodically passing said counter signals and having inputs connected to the outputs of said counter means and outputs corresponding to said inputs;
 c. a plurality of digital to analog converters having inputs connected to said logic switch outputs and outputs corresponding to said inputs;
 d. means for weighting each individual output signal of said converters connected to said converter outputs and having outputs;
 e. summing means for combining said weighting means outputs having inputs connected to said weighting means outputs and said summing means having an output; and
 f. analog amplifier for scaling said summing means output having an input connected to the output of said summer and an output connected to said clock.

10. The apparatus as described in claim 9 wherein said logic switch comprises a gate controlled by a trigger generator circuit adjusted to pass a signal every T seconds.

11. In an n-node digital network, an apparatus for synchronizing the processing of data arriving at a node from other nodes comprising:
 a. a plurality of input paths at each node receiving data bits and connected to a nodal processor, each said path including buffer means and timing and recovery circuit means for storing data bits arriving at said node; and
 b. timing and control means connected between said buffer and timing and recovery circuit means and said nodal processor for controlling the frequency of release and transfer of data bits along said path to said nodal processor, said timing and control means having oscillator circuit means with a gain factor of G for timing the frequency of release of the date bits and a clock control circuit means for periodically adjusting every T seconds the frequency of release of data by said timing and control means, said clock control means including means for sampling, weighting and summing the level of fill of each of said buffer and timing and recovery circuit means whereby the frequency of release of data bits by said timing and control means is selectively changed according to said means for sampling, weighting and summing the level of fill of each of said buffer and timing and recovery circuit means to minimize underfilling and overfilling of each of said buffer and timing and recovery circuit means.

* * * * *